United States Patent [19]
Stephenson

[11] Patent Number: 5,548,173
[45] Date of Patent: Aug. 20, 1996

[54] SWITCHED RELUCTANCE MOTORS

[75] Inventor: John M. Stephenson, Leeds, England

[73] Assignee: Switched Reluctance Drives Limited, Leeds, England

[21] Appl. No.: 479,793

[22] Filed: Jun. 7, 1995

Related U.S. Application Data

[63] Continuation of Ser. No. 163,171, Dec. 7, 1993, abandoned.

[30] Foreign Application Priority Data

Dec. 10, 1992 [GB] United Kingdom ............... 9225846

[51] Int. Cl.⁶ ..................................... H02K 37/02
[52] U.S. Cl. ............................. 310/181; 310/168
[58] Field of Search ..................... 310/181, 154, 310/166, 168, 181, 186, 190, 103, 192, 214, 254

[56] References Cited

U.S. PATENT DOCUMENTS

| | | | |
|---|---|---|---|
| 747,698 | 12/1903 | Geisenhöner | 310/214 |
| 3,891,905 | 6/1975 | Müller | 310/68 |
| 3,932,069 | 1/1976 | Giardini et al. | 310/268 |
| 3,984,711 | 10/1976 | Kordik | 310/181 |
| 3,999,107 | 12/1976 | Reuting | 310/181 |
| 4,812,695 | 3/1989 | Parshall | 310/214 |
| 5,015,904 | 5/1991 | Kleemann | 310/214 |
| 5,043,618 | 8/1991 | Stephenson | 310/168 |
| 5,049,773 | 9/1991 | Shinagawa et al. | 310/254 |
| 5,117,144 | 5/1992 | Török | 310/254 |
| 5,122,697 | 6/1992 | Horst | 310/181 |
| 5,294,856 | 3/1994 | Horst | 310/181 |
| 5,345,131 | 9/1994 | Torok | 310/181 |

FOREIGN PATENT DOCUMENTS

| | | | |
|---|---|---|---|
| 0343845 | 5/1989 | European Pat. Off. . | |
| 0455578 | 4/1991 | European Pat. Off. . | |
| 2382127 | 1/1978 | France . | |
| 2804166 | 8/1978 | Germany . | |
| 2813701 | 10/1978 | Germany | 310/181 |
| 3008937 | 9/1981 | Germany . | |
| 9003028 | 8/1990 | Germany . | |
| 56-78368 | 6/1981 | Japan | 310/181 |
| 893611 | 4/1962 | United Kingdom | 310/181 |

*Primary Examiner*—Clayton E. LaBalle
*Attorney, Agent, or Firm*—Patterson & Keough, P.A.

[57] ABSTRACT

A switched reluctance motor has groups of adjacent poles of the same polarity. A starting magnet is fitted to one side of one or more of the poles in one or more of the groups. The polarity of the magnet can be the same as that of its host pole. The starting magnet influences the rest position of the rotor when it is not being driven so that the rotor will not be in an orientation such that it will not start when the stator poles are energized.

15 Claims, 5 Drawing Sheets

SWITCHED RELUCTANCE MOTORS

This is a continuation of application Ser. No. 08/163,171, filed Dec. 7, 1993, now abandoned.

BACKGROUND OF THE INVENTION

1. Field of the Invention

This invention relates to switched reluctance motors.

2. Description of Related Art

A form of switched electric reluctance motor is proposed in U.S. Pat. No. 5,043,618. The motor disclosed in that patent has two poles per pole group, and stator and rotor pole arcs of about 30°. An example is illustrated in FIG. 1 of the drawings. FIG. 2 illustrates the static torque curve, which is derived from the torque developed by the motor with a constant excitation current in the windings, as a function of the angle θ of rotation of the rotor. Such curves are characteristic of doubly salient pole motors and can be calculated or measured.

Positive torque is assumed to drive the motor in the forward, clockwise, direction so that the angle of rotation θ is increasing positively in FIG. 2 in normal operation. At low speed the winding carries current throughout the range of the angle of rotation θ corresponding to the positive torque, from θ=−45° to θ=0°.

It will be appreciated with reference to FIG. 2 that the motor will only start from rest in the forward direction if the rotor is in a position corresponding to a region of positive torque. On the other hand, if the coil is switched across a d.c. voltage supply when the rotor is in a region corresponding to negative torque, the resulting current in the winding will cause the motor to move in the reverse direction. It will be further appreciated that there are two positions in each torque cycle at which no torque will be developed, e.g. θ=0° and θ=−45° in FIG. 2. A rotor angle of θ=0° corresponds to a stable condition because if the rotor is displaced from this position in either direction, with current flowing in the winding, the torque will restore the rotor to the initial position. On the other hand, position θ=−45° corresponds to an unstable position because displacement of the rotor from the position in either direction will cause the rotor to move away from the initial position.

The rotor 1 in FIG. 1 is in a stable position of zero torque in relation to the stator 2. Thus, in this position, the motor will fail to start when current is fed to the windings.

In the motor of FIG. 3 the rotor is in the unstable position of zero torque with the inter-pole axes of the rotor 1 aligned with the axes of the stator poles.

Thus, there are regions in the rotor cycle in which the above motor will not start and regions in which there will be uncertainty as to at least the initial direction of rotation of the rotor.

SUMMARY OF THE INVENTION

According to the present invention there is provided a switched reluctance motor comprising a stator defining stator poles and having stator windings for energising the stator poles; and a rotor defining rotor poles, movement of the rotor being influenced by the stator poles according to the energisation of the stator windings; wherein at least one stator or rotor pole has a magnetisable member attached to it in a position such that it influences the rest position of the rotor i.e. non-zero starting-torque position, when the coils are not energised, to maintain the rotor in a non-zero starting-torque position relative to the stator.

The invention provides for the reliable starting of reluctance motors and is particularly applicable to the motors described in U.S. Pat. No. 5,043,618. A permanent magnet or magnets may be added to the motor such that when the rotor is at rest, in the absence of current in the stator winding and providing there is not excessive friction or other applied load, the rotor poles will be positioned in relation to the stator poles to ensure rotation when current is supplied to the stator winding. The magnet or magnets are placed at the side of the stator pole or poles in the space between the poles of a pole group and facing the rotor pole across the air gap between them.

Preferably, the magnetisable member is mounted angularly to one side of its host pole. The member may be mounted in a recess in the host pole or on a side face of the host pole.

The particular advantage of this invention in relation to the type of motor described in U.S. Pat. No. 5,043,618 is that the magnetisable member can be located on the side of a host pole not otherwise occupied by any active material of the motor. Thus, the member can be mounted in a region of substantially no working flux and the operation of the motor is substantially unaffected by the modification.

A motor according to the invention may have the same number of poles as that described in U.S. Pat. No. 5,043,618, but the pole face of one or more of the stator poles is effectively extended circumferentially by a permanent magnet preferably of the same polarity as that produced in the pole by excitation current in the windings. In effect, in the absence of a current, a rotor pole or poles will usually come to rest facing the magnet or magnets. Occasionally the rotor may come to rest with a inter-polar axis of the rotor facing the magnet. In either case a pulse current in the winding will cause the rotor poles to move towards alignment with the stator poles. If as would usually be the case this initial movement is in the normal forward direction, the inertia of the rotor and any connected load will cause the rotor to move past the aligned pole position and thereafter normal switching of the currents under the control of a conventional rotor position sensor will proceed in the well known manner.

If the initial movement is in the reverse direction, the rotor pole will move past the aligned position and current switching under the influence of the rotor position sensor will cause the rotor to reverse its direction of rotation and proceed in the well known manner. In order to ensure starting from any of the possible initial positions, it is simply necessary initially to override the position sensor for a short time when the initial rotor position corresponds to a normally unexcited state. This can easily be implemented, for example, by a logic OR function to which the input signals of the output of the position sensor and a timed pulse initiated by the switch-on command are applied.

BRIEF DESCRIPTION OF THE DRAWINGS

The present invention can be put into practice in various ways, some of which will now be described by way of example with reference to the accompanying drawings in which.

DETAILED DESCRIPTION OF PREFERRED EMBODIMENTS

Figure 4:
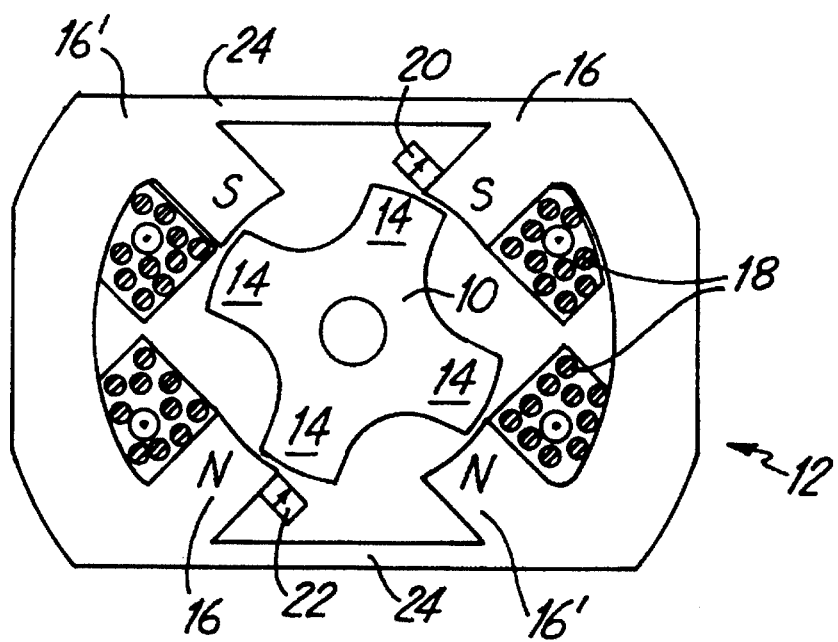
FIG. 4 is a cross-section of a first embodiment of the invention.

Referring to FIG. 4, a switched reluctance motor comprises a rotor 10 which is mounted to rotate inside a stator 12. The motor is of the doubly salient type. The rotor has four equiangularly spaced working rotor poles 14. Similarly, the stator has four equiangularly spaced stator working poles 16 and 16'. The clearance between the faces of the poles on the rotor and the stator as the rotor rotates defines an air gap. The stator poles are excited by a pair of windings 18 to create a pair of adjacent north poles N and a pair of adjacent south poles S according to the motor construction disclosed in U.S. Pat. No. 5,043,618.

One pair of opposed stator poles 16 each has a permanent magnet 20,22 mounted on its exposed side opposite that side adjacent its pole winding. The magnet has an orientation which is the same as its host stator pole 16, as seen at the pole face, and effectively forms an extension of the pole face. The longitudinal or axial extent of the magnet may be the same as that for the stator itself or be a proportion of it. In the latter case the magnet may be located toward one axial end of the stator or in a region part way along it.

As clearly shown in e.g. FIG. 4, permanent magnets 20, 22 are offset from their respective stator poles 16 in an angular direction parallel to the angular rotational direction of rotor 10. Rotor 10 rotates in a plane of rotation, and permanent magnets 20, 22 and their respective stator poles 16 are located in a common plane that is coplanar with, or at least parallel to, the plane of rotation of rotor 10. Also as clearly shown in e.g. FIG. 4, permanent magnets 20, 22 are directly exposed to rotor 10, i.e. there is no intervening structure between magnets 20, 22 and rotor 10. Additionally, magnets 20, 22 are located on a side of stator poles 16 that is unoccupied by windings 18, as shown.

Figure 5:
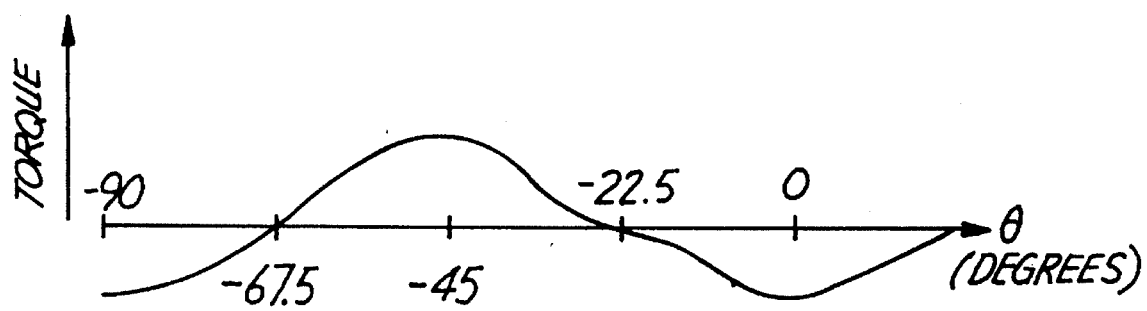
FIG. 5 is a torque curve for the magnet of the invention in the embodiment of FIG. 4.

FIG. 5 shows the static torque curve due to each of the permanent magnets 20,22 as a function of the angle of rotation θ of the rotor 10. It will be observed that the magnets produce a positive torque in the region around the unstable zero torque position of the static torque curve due to current excitation in FIG. 2 and that the magnets produce a negative torque in the region around the stable zero torque position of the stator torque curve due to the current excitation in FIG. 2.

Figure 6:
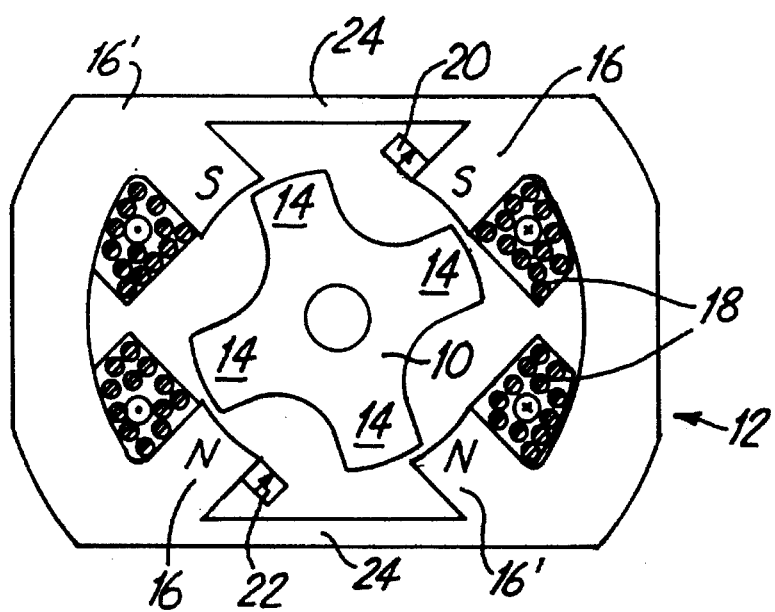
FIG. 6 is a cross-section according to FIG. 4 with the rotor position shifted.

FIG. 6 shows the motor of FIG. 4 with the rotor angularly displaced such that two of the inter-polar axes of the rotor poles are aligned with the axially opposed permanent magnets 20, 22. FIGS. 4 and 6 show respectively the motor of the present invention with its rotor in the stable and unstable positions of zero torque derived from the permanent magnets as illustrated in the curve of FIG. 5.

Figure 2:
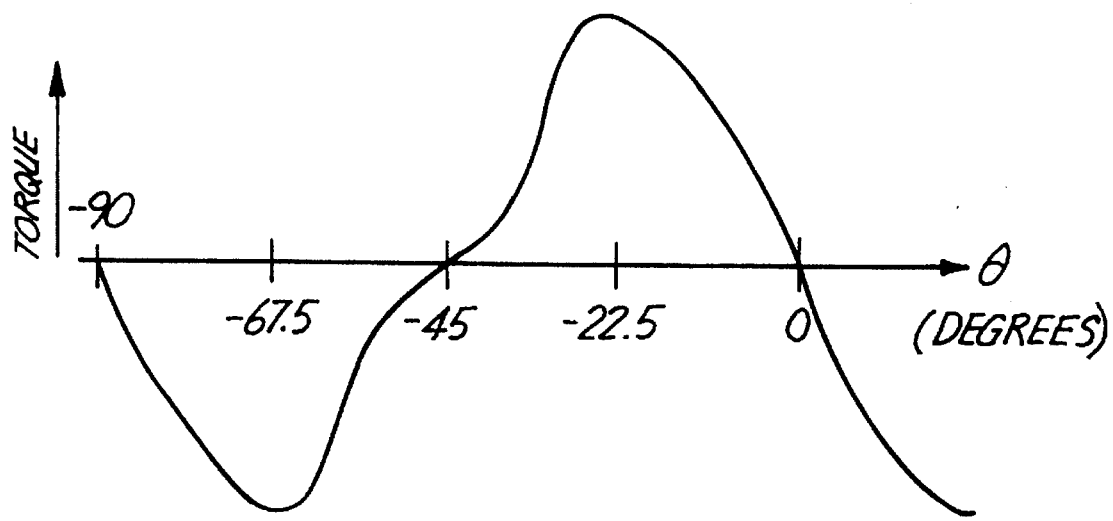
FIG. 2 is a torque curve for the FIG. 1 motor.
Figure 3:
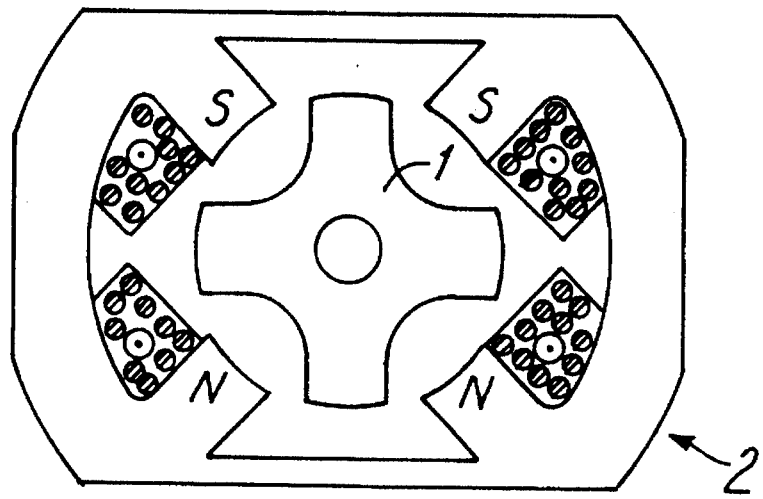
FIG. 3 is a cross-section of the FIG. 1 motor with the motor position shifted.

It will be understood that rotor position sensing means connects the d.c. voltage to the supply over the regions of positive torque of FIG. 2 (e.g. θ=−45° to θ=0°).

In the absence of current, if the rotor is initially stationary at what would have been a stable position of zero torque in FIG. 2 (e.g. θ=0°), the negative torque produced by the magnets will cause it to move in the reverse direction to the stable zero torque position of FIG. 5 (e.g. θ=−22½°). If the rotor is initially stationary at an unstable position of zero torque in FIG. 2 (e.g. θ=−45°), the positive torque produced by the magnet will cause it to move in the forward direction to the stable zero torque position in FIG. 5 (e.g. θ=22°).

Figure 1:
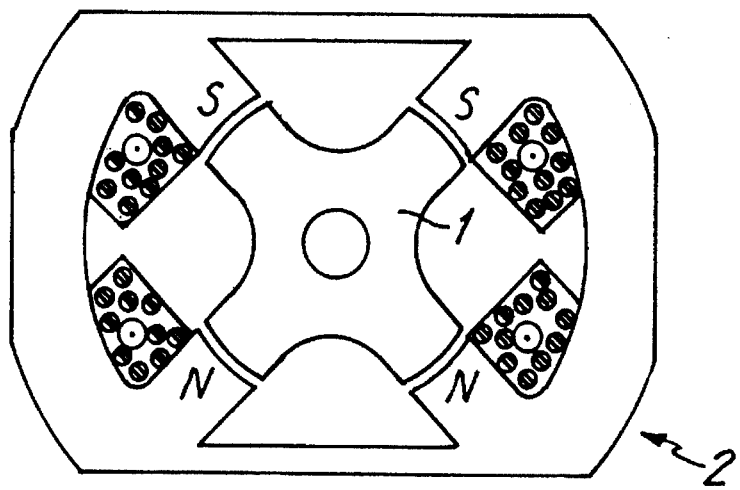
FIG. 1 is a cross-section of a prior art switched reluctance motor.

While previously if the motor of FIG. 1 was switched on with the rotor at rest in any zero torque position for the excitation currents it would fail to start, the magnets extending the pole faces of the present invention prevent it settling in any of these positions. Indeed, it will start particularly well from a position such as θ=−22½° because of the large positive torque in this region. Thus, a particularly well-suited rest position lies in a region of maximum rotor torque generation when the coil is energized.

More generally, by the same reasoning, the rotor will not remain at rest at any angle other than the stable and unstable zero torque positions of FIG. 5 in the absence of any load the magnets themselves are unable to overcome. In the unlikely event that the motor is at rest in an unstable zero torque position (e.g. θ=−67½°), a short pulse of excitation of the winding will impart negative torque to the rotor and cause it to move in the reverse direction to a stable zero torque position e.g. −22½°, or to a region in which the excitation under the control of the rotor position sensing means imparts sufficient positive torque to cause it to reverse its direction of rotation to the forward direction so that normal forward running is established.

As stated above, the motor of FIGS. 4 and 6 is designed to run in a clockwise direction. Thus, the end faces of magnets 20, 22 form an extension of the end surface of their respective working stator poles 16 in an angular direction opposite to the angular direction of rotation of rotor 10. If, on the other hand, it is desired that the motor start and run in the anti-clockwise direction, this can be achieved by repositioning the magnets 20,22 on the exposed sides of the adjacent poles 16' of like polarity. This will tend to shift the rotor at rest to a non-zero torque position in which the rotor poles are displaced to the opposite side of an adjacent stator pole.

In practice motors designed according to the invention usually develop much greater torques at full current than are developed by the magnets, i.e. the ratio of peak torque in FIGS. 2 and 5 is usually considerably greater than the relative maximum departures of the respective curves from zero torque indicated. The magnitude and shape of the static torque curve of the magnet can be controlled and designed by the length of the magnets in the longitudinal direction parallel to the axis of the motor, the type of permanent magnet material used and by their radial extent. Only one magnet need be used. However, while any realistic number may be used the use of two is preferred.

The motors are used in applications in which the friction forces and static load forces are significantly lower than the maximum torques produced by the permanent magnets. A fan drive is a typical example of an application to which the motor is well suited.

It will be appreciated in relation to U.S. Pat. No. 5,043,618 that the region of back of core 24 between poles of a pole group in the modified form carries flux due to the permanent magnets because they are positioned asymmetrically with respect to this part of the magnetic structure. This flux is relatively small and the benefits of reduced lamination material may still be exploited. In fact, the invention is still applicable even when the back of core regions 24 are removed altogether because the flux of the magnets 20 and 22, after crossing the air gap, returns to the stator through the stator poles 16 and 16'.

An important feature of the invention is its simplicity and ease of manufacture. A attractive feature in this respect is that the magnets can be assembled in an unmagnetised state, the magnet being magnetised after assembly by the passage of currents through the stator windings. Alternatively, electro-magnets magnetisable by means of an auxiliary winding may be used in place of permanent magnets. In this case the magnet core material need not be permanently magnetised. The excitation of the magnetisable member may be under the control of a motor control circuit having an auxiliary program operable simply to excite the member to urge the rotor out of an undesirable position only for starting and then to de-energise the member while the motor is running or not in use.

Figure 7:
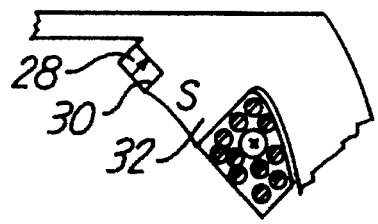
FIGS. 7 to 11 are partial cross-sections of further embodiments of the invention.
Figure 8:
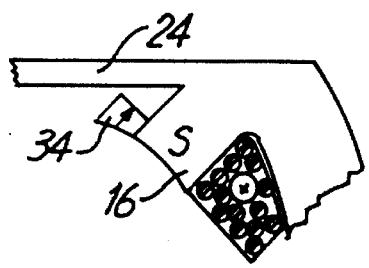

FIG. 7 shows a stator pole magnet 28 mounted in a recess 30 in the pole 32 itself. The pole face is arcuate, but the surface of the starting magnet facing the rotor pole path is flat. In FIG. 8 a magnet 34 is again mounted on the side of the host stator pole 16. However, the surface of the magnet facing the rotor pole path is arcuate, having the same radius of arc as the stator pole face and defining the same air gap as the host stator pole face with respect to the rotor pole face. The arcuate face on the starting magnet allows it to maintain its optimum closeness to the periphery of the rotor pole path. Because of this the starting force exerted by the magnet is greater over a wider arc than for a magnet of equal strength but with a flat facing surface.

Figure 9:
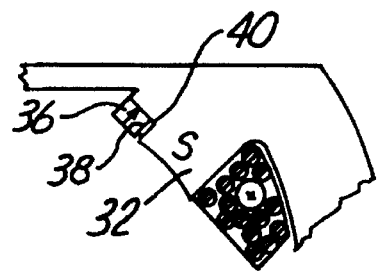

FIG. 9 illustrates a magnet 36 in a recess 38 in the stator pole 32. The magnet is angularly spaced from the pole face by a non-magnetic spacing piece 40. An example of a spacing piece would be some glue to hold the magnet in place causing the spacing, or an adhesive pad having the same function.

Figure 10:
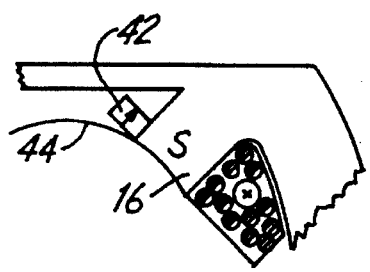

In FIG. 10 a magnet 42 is located behind an arcuate section non-magnetic cover plate 44. The plate 44 extends between the edges on the exposed side of adjacent stator poles 16. Together with the arcuate pole faces the cover plate presents a smooth circular surface to the rotating rotor when such plates are fitted between all adjacent poles. This is aerodynamically advantageous and serves to reduce the wind noise and windage losses in the motor. Because the plate 44 is non-magnetic it is magnetically indistinguishable from the air gap in terms of its reluctance to the flow of flux.

Figure 11:
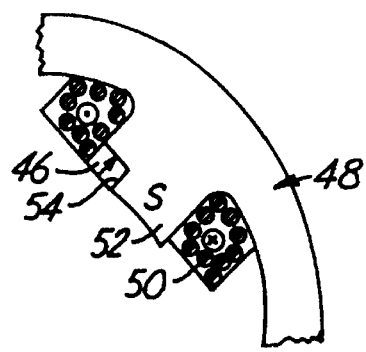

In FIG. 11 a magnet 46 is shown on a stator 48 in which a winding 50 embraces a single pole 52 as described in U.S. Pat. No. 5,043,618. The magnet 46 is mounted in a recess 54 in the host stator pole similar to the arrangement in FIG. 7.

It will be appreciated that one or more magnets according to the invention can be fitted to a motor. Where there are more than two poles in a group of poles a selection or all of the poles in the group may be fitted with a magnet, e.g. two starting magnets can be fitted on two poles in a group of three. Differing arrangements of magnet can also be used on the same motor.

Figure 12:
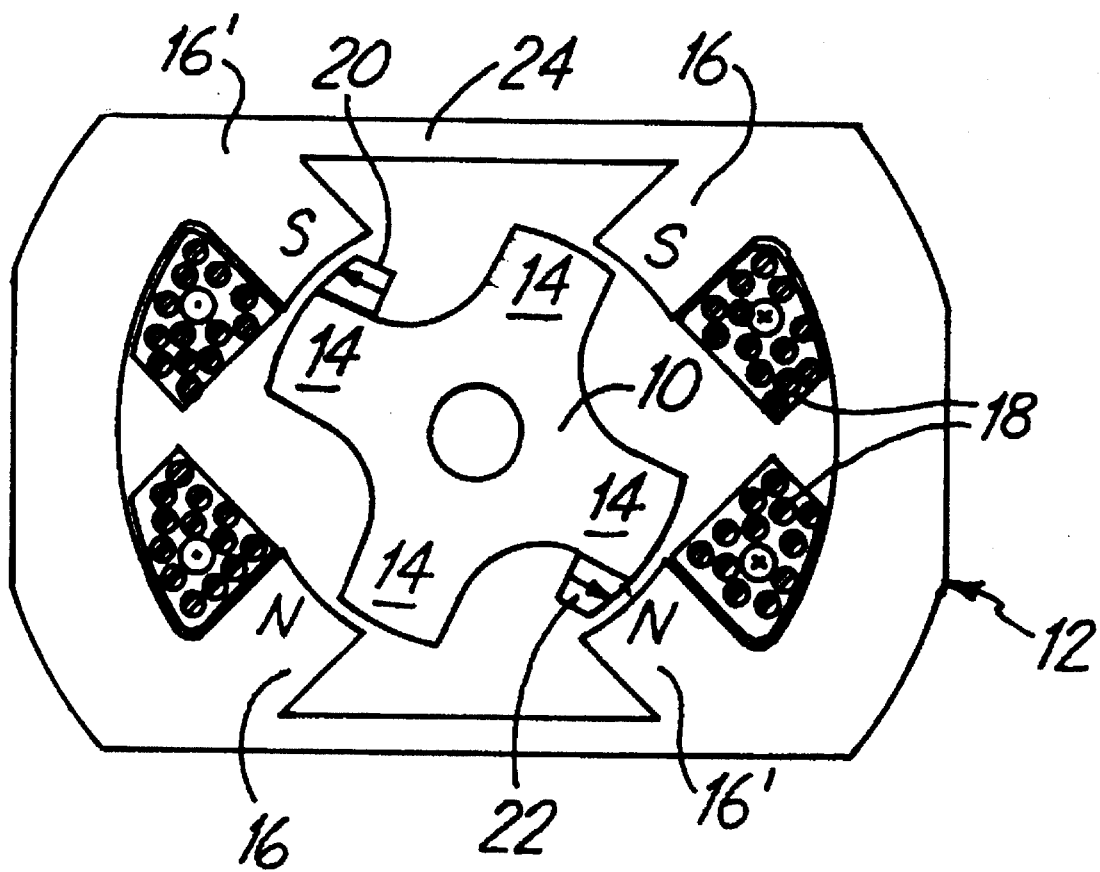
FIG. 12 is a cross-section showing a further embodiment of the invention.

The magnetisable member may equally well be attached to a rotor pole, as shown in FIG. 12. However, because the rotor is rotating at speed careful consideration must be given to balancing it and to attaching it securely to the host rotor pole.

It will also be appreciated that the motor according to the invention can be run as a generator.

I claim:

1. A switched reluctance motor comprising:
   (a) a stator defining working stator poles and having at least one stator winding, each stator winding for energizing a plurality of working stator poles;
   (b) a rotor defining working rotor poles, rotational movement of the rotor in an angular direction being influenced by the working stator poles according to energization of the at least one stator winding such that energization of the at least one stator winding causes energization of each working stator pole to promote movement of the rotor;
   (c) magnetizable means, attached to at least one host pole selected from the group consisting of the working stator poles and the working rotor poles, the magnetizable means being positioned to influence a rest position of the rotor when the at least one stator winding is not energized to maintain the rotor in a non-zero starting-torque position relative to the stator, the magnetizable means extending from said at least one host pole in an angular direction parallel to the angular direction of rotation of the rotor, the magnetizable means and said at least one host pole both being disposed in a common plane that is coplanar with or parallel to a plane of rotation of the rotor.

2. The motor of claim 1 wherein the magnetizable means comprises a permanent magnet.

3. The motor of claim 1 wherein the magnetizable means is mounted angularly to one side of the host pole.

4. The motor of claim 3 wherein working stator poles of like magnetic orientation are grouped together and the magnetic orientation of adjacent groups is different, the magnetizable means being attached to at least one working stator pole of at least one working group of working stator poles of like orientation.

5. The motor of claim 1 wherein the magnetizable means is mounted in a recess in a face of the host pole.

6. The motor of claim 1 wherein the magnetizable means is mounted on a side face of the host pole.

7. The motor of claim 1 wherein the magnetizable means comprises an end face which is arcuate with respect to an axis of rotation of the rotor.

8. The motor of claim 1 further comprising a non-magnetic cover plate which spans angularly extending gaps between the working stator poles such that a substantially smooth circular section surface is presented to the rotor.

9. The motor of claim 1 wherein polarity of the magnetizable means is orientated in the same direction as polarity of the energized host pole.

10. The motor of claim 1, further wherein:
   the magnetizable means is attached to at least one working stator pole;
   the magnetizable means comprises a flat end surface facing the rotor;
   the at least one working stator pole on which the magnet is mounted comprises a curved end surface facing the rotor; and
   the end surface of the magnet and the end surface of the at least one working stator pole are connected to form a substantially continuous surface.

11. A switched reluctance motor comprising:
   (a) a stator defining working stator poles;
   (b) a rotor defining rotor poles;
   (c) at least one coil, located with respect to the working stator poles so that working stator poles of like relative magnetic orientation are grouped in a group of adjacent working stator poles with respect to the coil and a relative magnetic orientation of adjacent groups of the working stator poles is different; and (d) at least one permanent magnet for maintaining the rotor in a non-zero torque starting position relative to the stator, the magnet being attached to one side of at least one of the working stator poles in a position which influences a rest position of the rotor when the coil is not energized, the one side being a side of the working stator pole that is unoccupied by the coil, the rest position being in a region of maximum rotor torque generation when the coil is energized, the permanent magnet extending from the at least one working stator pole in an angular direction parallel to an angular direction of rotation of the rotor, the permanent magnet being directly exposed to the rotor.

12. The motor of claim 1, wherein the magnetizable means comprises an end face which is flat with respect to an axis of rotation of the rotor.

13. A switched reluctance motor, comprising:

a rotor comprising a plurality of rotor poles;

a stator comprising a plurality of working stator poles and a stator winding, the stator winding energizing each of the working stator poles to influence rotational movement of the rotor in an angular direction; and a magnet mounted on at least one of the working stator poles on a side unoccupied by the stator winding to cause the rotor to assume a desired position relative to the stator when the stator winding is not energized, the magnet comprising a flat end surface facing the rotor, the at least one working stator pole on which the magnet is mounted comprising a curved end surface facing the rotor, the end surface of the magnet and the end surface of the at least one working stator pole being connected to form a substantially continuous surface.

14. The motor of claim 13, wherein the magnet is mounted on one side of the at least one working stator pole, the flat end surface of the magnet forming an extension of the end surface of the at least one working stator pole in an angular direction opposite to the angular direction of rotation of the rotor.

15. The motor of claim 13, further comprising a plurality of magnets mounted on respective working stator poles of opposite polarity.

* * * * *